United States Patent [19]

Allen et al.

[11] Patent Number: 5,253,357

[45] Date of Patent: Oct. 12, 1993

[54] SYSTEM FOR DETERMINING PLUGGABLE MEMORY CHARACTERISTICS EMPLOYING A STATUS REGISTER TO PROVIDE INFORMATION IN RESPONSE TO A PRESET FIELD OF AN ADDRESS

[75] Inventors: Greg L. Allen; Jae-Hu Kim; Lynn R. Watson, all of Boise, Id.

[73] Assignee: Hewlett-Packard Company, Palo Alto, Calif.

[21] Appl. No.: 715,077

[22] Filed: Jun. 13, 1991

[51] Int. Cl.$^5$ .............................................. G06F 12/06
[52] U.S. Cl. ............................... 395/425; 365/230.01; 364/929.4; 364/DIG. 2
[58] Field of Search ............... 395/425, 400, 325, 800, 395/275; 340/825.07, 825.52; 365/230.01; 371/11.1

[56] References Cited

U.S. PATENT DOCUMENTS

| | | | |
|---|---|---|---|
| 4,281,392 | 7/1981 | Grants et al. | 364/900 |
| 4,545,010 | 10/1985 | Salas et al. | 364/200 |
| 4,630,212 | 12/1986 | Shigeta | 364/470 |
| 4,701,878 | 10/1987 | Günkel et al. | 364/900 |
| 4,744,025 | 5/1988 | Lipcon et al. | 364/200 |
| 4,980,850 | 12/1990 | Morgan | 364/900 |
| 5,012,408 | 4/1991 | Conroy | 364/200 |
| 5,038,320 | 8/1991 | Heath et al. | 364/900 |
| 5,119,486 | 6/1992 | Albonesi | 395/425 |
| 5,175,836 | 12/1992 | Morgan | 395/425 |

*Primary Examiner*—Michael R. Fleming
*Assistant Examiner*—Gopal C. Ray

[57] ABSTRACT

A system is described that includes an arithmetic logic unit that senses the presence of a circuit module in a connector, wherein one type of circuit module, if present, automatically provides a set of signals on a predetermined pin set that indicates characteristics of the circuit module. The system also includes circuitry that enables the determination of the presence of other types of pluggable circuit modules in the connector. The circuitry comprises a latch circuit for holding a received address for the circuit module. In the received address, a preset field of bits is present which identifies a field in a status register. The status register stores n fields of information defining the characteristics of the pluggable circuit module and is responsive to the preset field of bits to provide signals on the predetermined pin set indicating the information.

6 Claims, 1 Drawing Sheet

SYSTEM FOR DETERMINING PLUGGABLE MEMORY CHARACTERISTICS EMPLOYING A STATUS REGISTER TO PROVIDE INFORMATION IN RESPONSE TO A PRESET FIELD OF AN ADDRESS

FIELD OF THE INVENTION

This invention relates to pluggable memory modules, and more particularly, to a system for determining the characteristics of a memory module when it is inserted into a standard connector receptacle.

BACKGROUND OF THE INVENTION

Over the last several years, a type of memory board has come into use called the SIMM (single in-line memory module). There are many types of SIMMs, i.e., 30 pins, 72 pins, and 80 pins. Typically, such modules are used for dynamic random access memories (DRAMs) and have predefined pin-out assignments. At present, the 72 pin SIMM sees the widest use in industry. For each of these SIMMs, an industry standard exists that defines the signals to be found on each pin. Thus, any DRAM that adheres to the SIMM standard and is plugged into a receiving connector, provides at the output pins of the connector, known signal levels and data.

Since DRAMs are ubiquitous in data processing systems, SIMM-connectors see wide usage therein. In such systems, it is also the case that other types of memory modules are used, although not in such large quantities. For instance, such other memory types include read only memories, electrically erasable, programmable read only memories; and battery-backed static random access memories. Additional expense is required if special connectors must be provided to accommodate the different types of memory modules. In addition, there are also certain DRAMs which do not meet the SIMM pin-out standard and also require special connector sockets.

In one industry standard for 72 pin DRAM SIMMs, four output pins are assigned to a "presence detect" function. When such a SIMM is plugged into a connector on a mother board, its presence detect pins are connected, via a resistance, to a power supply. Two of the four pins indicate one of four logic states which tells the user that the memory is one of four predefined sizes. The other two pins use three logic states to define one of three speeds. The fourth logic state, i.e., both speed pins at the high or one state, tells the user that the SIMM connector is empty. If a SIMM connector is to be utilized for other types of memory modules, it is important that the presence detect pins retain their standard output states so as to enable their continued usage for standard SIMM DRAMs, in addition to other memory modules.

In addition to the four-pin presence detect standard, others have employed various methods and means for determining the configuration of modular memories. DeVoy et al., in U.S. Pat. No. 3,803,560 describe a modular memory system which, in response to command signals, removes modules detected as faulty and reconfigures the remaining modules to form a continuous address space. In U.S. Patent RE 31,318 to Kaufman et al., a system is described for automatically setting the address ranges of memory modules in a continuous bank of memory modules. Each module includes an address range calculator, an address range detector, a local memory unit and memory cell selection logic. In operation, a processor generates a starting address signal for a first installed memory module. The address range for an individual memory module is calculated by adding the local memory unit capacity to the module's starting address to arrive at the module's ending address. This action ripples through additional memory modules until the last memory module generates an address signal which represents the upper boundary of the memory system.

A further memory allocation system is described in U.S. patent application Ser. No. 07/578,699 to Cox, assigned to the same assignee as this application. The Cox Application describes an expandable memory system that employs a plurality of plug-in memory modules. Each memory module includes a controller that is serially linked to a central memory controller. The memory system is automatically configured by the central controller and each memory module is assigned a base address which, in turn, helps to define a contiguous memory space and requires no user intervention. The system has the capability of disabling and bypassing bad memory modules and reassigning memory addresses without leaving usable memory unallocated.

Accordingly, it is an object of this invention to provide a modular memory arrangement wherein standard SIMM connectors are useable by all memory modules including DRAMs.

It is another object of this invention to provide a modular memory system wherein a memory module, upon being addressed, automatically provides information detailing the module's characteristics.

It is yet another object of this invention to provide a memory module that does not adhere to a predetermined standard for presence detect output pins, but is yet able to interface with a standard SIMM connector by internal control circuitry.

SUMMARY OF THE INVENTION

A system is described that includes an arithmetic logic unit that senses the presence of a circuit module in a connector, wherein one type of circuit module, if present, automatically provides a set of signals on a predetermined pin set that indicates characteristics of the circuit module. The system also includes circuitry that enables the determination of the presence of other types of pluggable circuit modules in the connector. The circuitry comprises a latch circuit for holding a received address for the circuit module. In the received address, a preset field of bits is present which identifies a field in a status register. The status register stores n fields of information defining the characteristics of the pluggable circuit module and is responsive to the preset field of bits to provide signals on the predetermined pin set indicating the information.

DESCRIPTION OF THE INVENTION

As has been described above, industry standards exist for DRAM SIMMs. In such standards, four presence detect pins on the SIMM connector are assigned to provide indications regarding the size and speed of a memory module connected thereinto. This invention provides the ability to recognize when a non-standard memory module is inserted into a standard SIMM connector and to determine the characteristics of the non-standard module via the presence detect pins, while preserving the connector's ability to also receive standard DRAM SIMMs.

Figure 1:
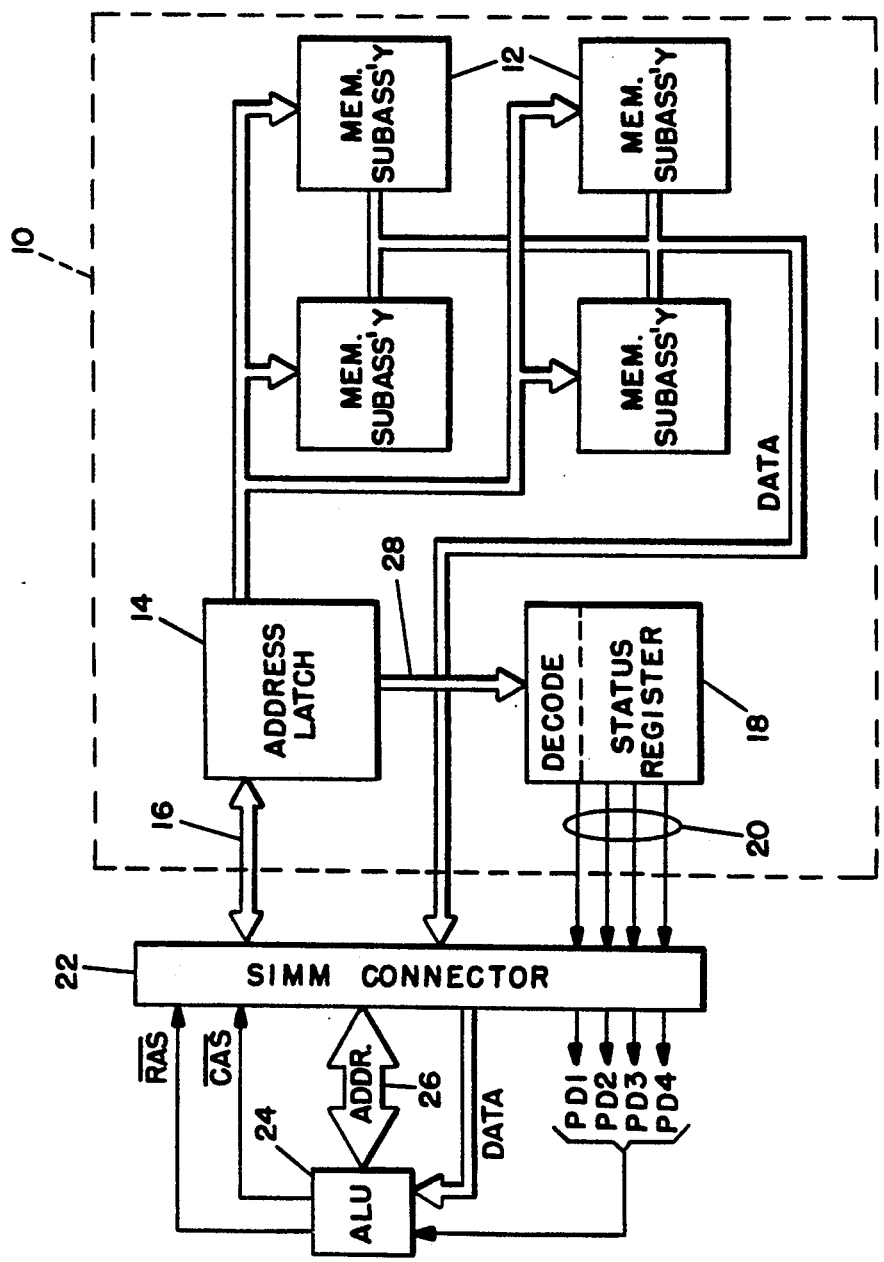
FIG. 1 is a block diagram illustrating the major subcomponents of the invention.

In FIG. 1, a block diagram indicates the structure of the invention. Dotted box 10 indicates a pluggable memory module which includes four memory assemblies 12, an address latch 14 and a status register 18. Address latch 14 receives memory addresses (and RAS and CAS control signals) over cable 16. Address latch 14 demultiplexes the memory addresses and places them in an intermediate storage contained therein.

A predetermined field of bits within the memory address stored in address latch 14 is used to address memory positions in a status register 18, as well as being part of the overall memory address directed to one of memory assemblies 12. Cable 28 extends between address latch 14 and status register 18 and includes individual lines from the bit positions in the memory address's predetermined field in address latch 14. The values stored in these bit positions, when decoded, address a memory position in status register 18.

Figure 2:
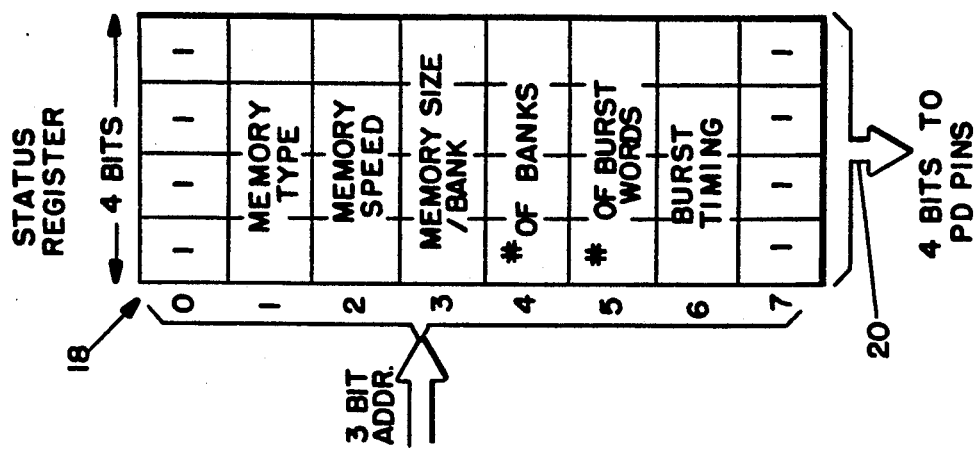
FIG. 2 is a schematic of the contents of the status register shown in FIG. 1.

As shown in FIG. 2, status register 18 contains n four-bit memory positions which contain four bit codes that define characteristics of memory module 10. Eight four bit code positions are shown and may be addressed by three bits in a received memory address. Of course, additional fields could also be provided, but a longer field address would be required. The first (0'th) field in status register 18 includes all 1 bits (whose function will be described below). Succeeding fields include code which indicates memory type; memory speed; memory size per bank; number of banks; number of first words; burst timing; etc..

Bit fields within status register 18 are read out via output lines 20 to a SIMM connector 22, where they appear on presence detect output pin PD1-PD4. From there, they are transmitted to an arithmetic logic unit (ALU) 24 which provides overall control of the memory system. In the known manner ALU 24 provides address bits via SIMM connector 22 to address latch 14. In addition, it provides RAS and CAS control signals (also via cable 16) to address latch 14).

The operation of ALU 24 is modified from that utilized with standard DRAM SIMM's. Previously, ALU 24 would merely examine presence detect pins PD1-PD4 to determine if all were at the one state. If so, no DRAM SIMM was present. If one of 15 other logic states was manifest on PD1-PD4, ALU 24 sensed those states and configured itself accordingly.

Now, ALU 24 initiates a memory configuration operation by generating a memory address which has a three bit field (e.g. bits 13-15 of a 22 bit address) which addresses the first field in status register 18 (e.g., three zero bits). The memory address provided from ALU 24 will generally be 22 bits in length and will be provided, via cable 26, in two segments of 11 bits each. The memory address can designate and address within memory subassemblies 12, so long as it contains the requisite 3 bit address for the first field in status register 18.

Address latch 14 demultiplexes the two 11 bit address segments (by using RAS and CAS control signals) and stores the address. Status register logic 15 detects the presence, in the latched address, of 3 bits which address the first field position in status register 18. As a result, a signal is emplaced on cable 28 that causes the four bits in the first field in status register 18 to be placed on conductors 20 where they appear on presence detect pins PD1-PD4. As will be recalled, all four bits are ones.

At the same time the initial field from status register 18 is being read out, a memory access occurs in accordance with the address stored in address latch 14. However, ALU 24 ignores the data read out from the addressed memory position.

As a result of all ones being manifest on presence detect pins PD1-PD4, ALU 24 does not know whether SIMM connector 22 is empty or has a non-standard memory module plugged in. ALU 24, as a result, generates a second memory address that includes a three bit address of the second field within status register 18. The second field in status register 18 is predefined as never having all ones. Since, as shown in FIG. 2, the second field indicates the memory type, 15 separate memory types can be encoded by various bit groupings.

If a memory module is installed in connector 22, in response to a second address being stored in address latch 14, status register 18 will read out the requisite memory type onto pins PD1-PD4. At this point, ALU 24 knows that a non-standard memory module is present in SIMM connector 22 and has identified the specific memory type. ALU 24 now continues to generate memory addresses that contain bit fields for sequentially addressing the remaining fields within status register 18. Once all 8 fields in status register 18 have been accessed, the next memory address generated (i.e. "9") has all zero's in the status register bit field and results in the addressing of field "0" in status register 18. As a result, ones are impressed on presence detect pins PD1-PD4, and ALU 24 then knows that status register 18 has completed its readout. Alternatively, ALU 24 can be pre-programmed to only recognize a predetermined number of fields within status register 18. As aforedescribed, while each of the addresses provided to address latch 14 enables a memory position to be read out of one of memory assemblies 12, the actual data that is passed through SIMM connector 22 to ALU 24 is ignored.

It may occur that no memory module resides in connector 22. In such case, upon ALU 24 generating a second memory address, the levels on PD1-PD4 all remain unchanged, at the one level. Two successive outputs of all one's on PD1-PD4 are recognized by ALU 24 as indicating that no memory module is present.

An advantage of this system is that actual memory addresses can be utilized to access status register 18 and its stored information. Additional memory positions do not, therefore, need to be reserved for status register readout. Furthermore, while status register 18 has been shown as having four bits in each of its fields, more can obviously be provided, as can additional information fields. Likewise, while the invention has been described in the context of memory system, it is equally applicable to other systems that employ discrete types of pluggable modules.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a system wherein an arithmetic logic unit senses the presence of a pluggable memory module in a connector, said pluggable memory module, if present, adapted to provide a set of signals on a predetermined pin set of said connector indicating characteristics of said pluggable memory module, said pluggable memory module including means resident thereon for providing said set of signals, said means comprising:

latch means for storing an address for said memory module that is received from said arithmetic logic unit and causing data resident at said address in said pluggable memory module to be accessed for said arithmetic logic unit;

circuit means for transmitting a predetermined field of bits in said received stored address, which predetermined field identifies a storage field in a status means; and said status means storing n fields of information concerning said pluggable memory module, and responsive to a said transmitted predetermined field of bits from said circuit means to provide a set of signals on said predetermined pin set indicating said information, said arithmetic logic unit ignoring said accessed data, but employing said set of signals on said predetermined pin set as indicators of characteristics of said pluggable memory module.

2. The system as recited in claim 1 wherein said arithmetic logic unit is responsive to bit information on said predetermined pin set, to generate additional addresses, each said additional address including a set of bits in said predetermined field which identifies an additional one of said n fields of information in said status means, whereby said status means responds by providing said information to said pin set.

3. The system as recited in claim 2 wherein said status means responds to an address for a first of its n fields by providing all one level signals on said predetermined pin set, said arithmetic logic unit responsive thereto to generate signals that address additional fields in said status means, whereby said status means provides to said predetermined pin set, information resident in said additional fields.

4. The system as recited in claim 3 wherein, said arithmetic logic unit continues to generate additional address signals until all one level signals are again sensed on said predetermined pin set.

5. The system as recited in claim 3 wherein said arithmetic logic unit continues to generate additional address signals until a predetermined number of fields have been accessed.

6. The system as recited in claim 2 wherein said pluggable memory module is a dynamic random access memory and wherein RAS and CAS signals are employed to latch a full address into said latch means.

* * * * *